3,180,900
PREPARATION OF p-NITROHALOBENZENES
Allen K. Sparks, Des Plaines, Ill., assignor to Universal Oil Products Company, Des Plaines, Ill., a corporation of Delaware
No Drawing. Filed Jan. 31, 1963, Ser. No. 255,183
15 Claims. (Cl. 260—646)

This invention relates to the nitration of halobenzenes. More particularly, this invention relates to a method of increasing the amount of the para isomer in a nitrohalobenzene nitration product.

Nitrohalobenzenes are in general valuable chemical intermediates in the production of dyes, and also in the production of inhibitors or antiozonants for rubber, gasoline, and the like. In many cases, products prepared from the para isomer of a nitrohalobenzene possess superior qualities with respect to their intended application. For example, it is known that N-phenyl-N'-cyclohexyl-p-phenylenediamine is a particular effective antiozonant for rubber. The preparation of this highly useful compound is initially dependent upon the preparation of p-nitrochlorobenzene—a product of the method of this invention—which, upon condensation with aniline, followed by reductive alkylation with cyclohexanone, is converted to the desired N-phenyl-N'-cyclohexyl-p-phenylenediamine.

It is an object of this invention to present a novel method of nitrating a halobenzene to effect an increase in the amount of a para isomer in the nitrohalobenzene nitration product.

In one of its broad aspects this invention embodies a method of increasing the amount of the para isomer in a nitrohalobenzene nitration product, which method comprises nitrating a halobenzene with nitric acid in an alkanecarboxylic acid solution of sulfuric acid, said sulfuric acid comprising from about 20 mole percent to about 85 mole percent of said carboxylic acid solution.

A more specific embodiment is in the nitration of chlorobenzene, and the method of increasing the amount of p-nitrochlorobenzene in the nitrochlorobenzene nitration product, which method comprises nitrating said chlorobenzene with nitric acid in an acetic acid solution of sulfuric acid, said sulfuric acid comprising from about 35 mole percent to about 70 mole percent of said acetic acid solution.

Other objects and embodiments of the present invention will become apparent in the following detailed specification.

The method of this invention finds specific utility with respect to nitratable halobenzenes subject to the ortho-para directing influence of the halo substituent, or substituents, wherein the position para to the halo substituent, and at least one position ortho thereto, are open to nitration. The present invention is particularly applicable to the nitration of monohalobenzenes, i.e., chlorobenzene, bromobenzene, fluorobenzene, and iodobenzene. It is contemplated that the method of this invention in effect inhibits the ortho directing influence of the halo substituent and thereby effects an increase in the amount of the para isomer in the nitrohalobenzene nitration product, the para position being open to nitration. For example, in the nitration of 1,2-dichlorobenzene, substitution on the aromatic nucleus is inhibited in a position ortho to either of the chloro substituents so that nitration occurs principally in a position para to either of the chloro substituents to give primarily a 1,2-dichloro-4-nitrobenzene nitration product. The method of this invention is thus further applicable to the nitration of dihalobenzenes including 1,2-dibromobenzene, 1,2-difluorobenzene, 1,2-diiodobenzene, etc., and also trihalobenzenes including 1,2,3-trichlorobenzene, 1,2,3-tribromobenzene, 1,2,3-triiodobenzene, 1,2,3-trifluorobenzene, etc., and many other nitratable halobenzenes which will be apparent to those skilled in the art.

According to the method of the present invention, a nitratable halobenzene is nitrated with nitric acid in an alkanecarboxylic acid solution of sulfuric acid. The alkanecarboxylic acids which may be utilized are those which act as a mutual solvent for nitric and sulfuric acids at nitration reaction conditions while remaining substantially inert to the oxidizing effect of nitric acid. In general, alkanecarboxylic acids containing from about 2 to about 10 carbon atoms are suitable. The normal or straight chain alkane carboxylic acids, for example, acetic acid (ethanoic acid), propionic acid (propanoic acid), butyric acid (butanoic acid), vareric acid (pentanoic acid), caproic acid (hexanoic acid), ethanoic acid (heptanoic acid), caprylic acid (octanoic acid), pelargonic acid (nonanoic acid), capric acid, (decanoic acid), etc., are preferred. However, the various structural isomers of the aforesaid acids are also operable although not necessarily with the same or equivalent results.

Cycloalkanecarboxylic acids, for example, cyclopentanecarboxylic acid, cyclohexanecarboxylic acid, and the like, are also operable. Also, dibasic alkanecarboxylic acids, wherein the carboxyl groups are separated by at least two carbon atoms, can be utilized. Suitable alkanecarboxylic acids thus further include succinic acid (1,2-ethanedicarboxylic acid), glutaric acid (1,3-propanedicarboxylic acid), adipic acid (1,4-butanedicarboxylic acid), pimelic acid (1,5-pentanedicarboxylic acid), suberic acid (1,6-hexanedicarboxylic acid), azelaic acid (1,7-heptanedicarboxylic acid), sebacic acid (1,8-octanedicarboxylic acid), etc.

When the nitratable halobenzene, such as chlorobenzene, such as chlorobenzene, is nitrated with nitric acid in an alkanecarboxylic acid, there is no observable deviation from the normal isomer distribution of about 65% para and about 35% ortho in the nitrohalobenzene nitration product. On the other hand, when the nitration takes place in an alkanecarboxylic acid solution of sulfuric acid the isomer distribution is substantially immediately shifted in favor of the para isomer although said solution comprises less than about 10 mole percent sulfuric acid. In general, a suitable yield of nitrohalobenzene nitration product, containing a substantial increase in the amount of para isomer therein, is effected in an alkanecarboxylic acid solution of sulfuric acid wherein said solution comprises from about 20 mole percent to about 85 mole percent sulfuric acid. A preferred embodiment of this invention relates to the nitration of a nitrable halobenzene wherein said halobenzene is nitrated with nitric acid in an alkanecarboxylic acid solution of sulfuric acid, said solution comprising from about 35 mole percent to about 70 mole percent sulfuric acid.

Nitration of halobenzenes in accordance with the method of this invention may be effected in a batch or continuous type of operation by any conventional or otherwise convenient means. One suitable manner of operation comprises a batch type of operation wherein the halobenzene to be nitrated and the alkanecarboxylic acid are initially charged to a reaction vessel equipped with suitable means of mixing and cooling the vessel contents. The halobenzene and the carboxylic acid are stirred together while sulfuric acid is added thereto with cooling. Nitric acid is thereafter added to the stirred contents of the reaction vessel by means of a dropping funnel, or other suitable device, at nitration reaction conditions. On completion of the nitration reaction, the reaction mixture is hydrolyzed and thereafter neutralized and excaustic solution. The aqueous layer is separated and extracted one or more times with benzene. The benzene extract is then combined with the organic layer, which is thereafter dried, and the nitrohalobenzene product, unreacted halobenzene, alkanecarboxylic acid, and benzene separated therefrom by conventional means, for example, by fractional distillation. In a continuous flow type of operation, the halobenzene, alkanecarboxylic acid, and sulfuric acid starting materials may be pre-mixed and the mixture continuously charged in a single stream to the reactor equipped with mixing and cooling means, or said starting materials may be continuously charged in individual streams and thereafter admixed in the stirred reactor. In either case, the mixture is subsequently contacted with a flow of nitric acid introduced to the reactor at a point downstream, and at nitration reaction conditions. The reactor effluent is continuously withdrawn at a rate which will insure an adequate residence time therein. The reaction mixture is treated as previously described and the unreacted starting materials recycled in combination with a fresh charge of the same.

The following examples are presented in illustration of the method of this invention. It is not intended that said examples serve to limit the generally broad scope of this invention as set out in the appended claims.

Example I

This example is presented to illustrate conventional isomer distribution of a nitrohalobenzene nitration product obtained in an alkanecarboxylic acid medium and in the absence of sulfuric acid. Over a period of about 1.5 hours, 17.5 grams of 90% nitric acid was added to a stirred mixture comprising 56.2 grams of chlorobenzene and 75 grams of acetic acid. The temperature was maintained at about 25° C. After a total reaction time of approximately 3 hours had elapsed the reaction mixture was poured over crushed ice and neutralized with 20% sodium hydroxide solution. The resulting aqueous layer was separated from the organic layer and extracted about 4 times with benzene. The benzene extract was then combined with the organic layer and dried over anhydrous sodium sulfate. After separation of the benzene by distillation the remainder of the reaction mixture was analyzed by gas-liquid chromatography methods. The yield of nitrochlorobenzene product, based on the quantity of nitric acid charged, was only about 1%, of which about 67% was the para isomer and about 33% was the ortho isomer.

Example II

This example is presented to illustrate the isomer distribution of a nitrohalobenzene product derived through conventional methods of nitration using a nitric acid-sulfuric acid nitrating mixture in the absence of an alkanecarboxylic acid. Over a period of about 1.5 hours, 17.5 grams of 90% nitric acid was added to a stirred mixture comprising 56.2 grams of chlorobenzene and 51 grams of 96% sulfuric acid. The temperature was maintained at about 25° C. After a total reaction time of about 3 hours the reaction mixture was poured over crushed ice, neutralized with 20% sodium hydroxide solution, and further treated as described in Example I. The yield of nitrochlorobenzene in this case amounted to about a 90% yield based on the quantity of nitric acid charged, of which about 65.3% was the para isomer, about 34.6% the ortho isomer, and about 0.1% the meta isomer.

Example III 61 grams of 96% sulfuric acid was added slowly and with cooling to a stirred solution comprising about 56.2 grams of chlorobenzene and 75 grams of acetic acid. Thereafter, and over a period of about 1.5 hours, 17.5 grams of 90% nitric acid was added with stirring while maintaining the reaction mixture at about 25° C. After a total reaction time of about 3 hours had elapsed the reaction mixture was poured over crushed ice, neutralized with 20% sodium hydroxide solution, and further treated as described in Example I. The yield of nitrochlorobenzene was about 95% based on the quantity of nitric acid charged. There was an increase in the para isomer to about 74.2%, a corresponding decrease in the ortho isomer to about 25.5%, and about 0.4% meta isomer. Substantially all of the acetic acid was recovered.

Example IV

About 18 grams of 90% nitric acid is added slowly and with cooling to a stirred mixture comprising about 51 grams of 96% sulfuric acid, 56 grams of chlorobenzene, and 93 grams of propionic acid. The nitric acid is added over a period of about 1.5 hours while maintaining the reaction temperature at approximately 25° C. After a total reaction time of about 3 hours, the reaction mixture is hydrolyzed with crushed ice, neutralized with about 20% caustic solution, and further treated as described in Example I. The nitrochlorobenzene product comprises in excess of about 70% p-nitrochlorobenzene and less than about 30% o-nitrochlorobenzene.

Example V

About 51 grams of 96% sulfuric acid was added slowly and with cooling to a stirred solution comprising about 78 grams of bromobenzene and about 45 grams of acetic acid. Thereafter, and over a period of about 1.5 hours, 17.5 grams of 90% nitric acid was added with stirring while maintaining the reaction mixture at about 25° C. After a total reaction time of about 3 hours, the reaction mixture was poured over crushed ice, neutralized with 20% sodium hydroxide solution, and further treated as described in Example I. The yield of nitrobromobenzene was about 80% based on the quantity of nitric acid charged, of which about 77.5% was the para isomer. Substantially all of the acetic acid was recovered.

Example VI

About 18 grams of 90% nitric acid is added slowly and with cooling to a stirred mixture comprising about 51 grams of 96% sulfuric acid, 56 grams of chlorobenzene, and 128 grams of pentanoic acid. The nitric acid is added over a period of about 1.5 hours while maintaining the reaction mixture at approximately 25° C. After a total reaction time of about 3 hours, the reaction mixture is hydrolyzed with crushed ice and thereafter neutralized with about 20% caustic solution, and further treated as described in Example I. The nitrochlorobenzene product comprises in excess of about 70% p-nitrochlorobenzene and less than 30% o-nitrochlorobenzene.

Example VII

About 18 grams of 90% nitric acid is added slowly with cooling to a stirred mixture comprising about 51 grams of 96% sulfuric acid, 56 grams of chlorobenzene, and 142 grams of cyclopentanecarboxylic acid. The nitric acid is added over a period of about 1.5 hours while maintaining the reaction mixture at approximately 25° C. After a total reaction time of about 3 hours, the reaction mixture is hydrolyzed with crushed ice and thereafter neutralized with about 20% caustic solution, and further treated as described in Example I. The nitrochlorobenzene product comprises an excess of about 70% p-nitrochlorobenzene and less than about 30% o-nitrochlorobenzene.

I claim as my invention:

1. In the nitration of a nitratable halobenzene, a method of increasing the amount of the para isomer in the nitrochlorobenzene nitration product, which method comprises nitrating said halobenzene with nitric acid in an alkane carboxylic acid solution of sulfuric acid, said sulfuric acid comprising from about 20 mole percent to about 85 mole percent of said carboxylic acid solution thereof.

2. The method of claim 1 further characterized in that said alkanecarboxylic acid is a cycloalkanecarboxylic acid.

3. The method of claim 1 further characterized in that said alkanecarboxylic acid is an alkanemonocarboxylic acid.

4. The method of claim 1 further characterized in that said alkanecarboxylic acid is a cycloalkanemonocarboxylic acid.

5. The method of claim 1 further characterized in that said alkane carboxylic acid is a n-alkanemonocarboxylic acid.

6. In the nitration of a nitratable halobenzene, a method of increasing the amount of the para isomer in the nitrohalobenzene nitration product, which method comprises nitrating said halobenzene with nitric acid in an alkanecarboxylic acid solution of sulfuric acid, said sulfuric acid comprising from about 35 mole percent to about 70 mole percent of said carboxylic acid solution thereof.

7. The method of claim 6 further characterized in that said alkanecarboxylic acid is a cycloalkanecarboxylic acid.

8. The method of claim 6 further characterized in that said alkanecarboxylic acid is an alkanemonocarboxylic acid.

9. The method of claim 6 further characterized in that said alkanecarboxylic acid is a cycloalkanemonocarboxylic acid.

10. The method of claim 6 further characterized in that said alkanecarboxylic acid is a n-alkanemonocarboxylic acid.

11. In the nitration of chlorobenzene, a method of increasing the amount of p-nitrochlorobenzene in the nitrochlorobenzene nitration product, which method comprises nitrating said chlorobenzene with nitric acid in an acetic acid solution of sulfuric acid, said sulfuric acid comprising from about 35 mole percent to about 70 mole percent of said acetic acid solution thereof.

12. In the nitration of chlorobenzene, a method of increasing the amount of p-nitrochlorobenzene in the nitrochlorobenzene nitration product, which method comprises nitrating said chlorobenzene with nitric acid in a propionic acid solution of sulfuric acid, said sulfuric acid comprising from about 35 mole percent to about 70 mole percent of said propionic acid solution thereof.

13. In the nitration of chlorobenzene, a method of increasing the amount of p-nitrochlorobenzene in the nitrochlorobenzene nitration product, which method comprises nitrating said chlorobenzene with nitric acid in a cyclopentane carboxylic acid solution of sulfuric acid, said sulfuric acid comprising from about 35 mole percent to about 70 mole percent of said cyclopentane carboxylic acid solution thereof.

14. In the nitration of chlorobenzene, a method of increasing the amount of p-nitrochlorobenzene, a method of increasing the amount of p-nitrochlorobenzene in the nitrochlorobenzene nitration product, which method comprises nitrating said chlorobenzene with nitric acid in an alkane dicarboxylic acid solution of sulfuric acid, said sulfuric acid comprising from about 35 mole percent to about 70 mole percent of said acetic acid solution thereof.

15. In the nitration of chlorobenzene, a method of increasing the amount of p-nitrochlorobenzene in the nitrochlorobenzene nitration product which methol comprises nitrating said chlorobenzene with nitric acid in a pentanoic acid solution of sulfuric acid, said sulfuric acid comprising from about 35 mole percent to about 70 mole percent of said pentanoic acid solution thereof.

References Cited by the Examiner

Paul: J.A.C.S. 80 pp. 5332 and 5333 (1958).

"Nitration of Hydrocarbons and Other Organic Compounds" (Topchiev), published by Pergamon Press Ltd. (England), 1959, pp. 41 and 42 are relied upon.

CARL D. QUARFORTH, *Primary Examiner.*